United States Patent [19]

Tawara

[11] Patent Number: 5,189,414
[45] Date of Patent: Feb. 23, 1993

[54] NETWORK SYSTEM FOR SIMULTANEOUSLY COUPLING PAIRS OF NODES

[75] Inventor: Kiyoshi Tawara, Ootawara, Japan

[73] Assignee: Kabushiki Kaisha Toshiba, Kawasaki, Japan

[21] Appl. No.: 681,455

[22] Filed: Apr. 4, 1991

Related U.S. Application Data

[63] Continuation of Ser. No. 609,015, Nov. 1, 1990, abandoned, which is a continuation of Ser. No. 101,121, Sep. 25, 1987, abandoned.

[30] Foreign Application Priority Data

Sep. 30, 1986 [JP] Japan ............................... 61-229682

[51] Int. Cl.[5] .............................................. H04Q 9/00
[52] U.S. Cl. ........................... 340/825.5; 340/825.02; 370/85.13; 370/94.3
[58] Field of Search ................... 340/825.02, 825.05, 340/825.5, 825.79; 370/4, 85.6, 85.11, 85.13, 85.14, 94.1, 94.2, 94.3

[56] References Cited

U.S. PATENT DOCUMENTS

| | | | |
|---|---|---|---|
| 3,925,621 | 12/1975 | Collins et al. | 370/88 |
| 4,347,498 | 8/1982 | Lee et al. | 370/94 |
| 4,373,183 | 2/1983 | Means et al. | 340/825.5 |
| 4,539,679 | 9/1985 | Bux et al. | 340/825.5 |
| 4,577,313 | 4/1986 | Sy | 370/85.14 |
| 4,701,756 | 10/1987 | Burr | 340/825.5 |
| 4,706,080 | 11/1987 | Sincoskie | 340/825.02 |
| 4,747,094 | 5/1988 | Sakaguchi et al. | 370/4 |
| 4,750,114 | 6/1988 | Hirtle | 340/825.52 |

FOREIGN PATENT DOCUMENTS

3150474 9/1982 Fed. Rep. of Germany.
3305115 8/1983 Fed. Rep. of Germany.

*Primary Examiner*—Donald J. Yusko
*Assistant Examiner*—Edwin C. Holloway, III
*Attorney, Agent, or Firm*—Oblon, Spivak, McClelland, Maier & Neustadt

[57] ABSTRACT

A network system includes a plurality of low-order networks which each have a plurality of nodes coupled through data transfer paths and are mutually coupled by a repeater for data communication between the nodes. The repeater has a switching circuit system including a plurality of switching circuits for selectively coupling the low-order networks. The repeater further has a switch controller for controlling the switching operation of the switching circuits in accordance with a communication request from each node.

16 Claims, 10 Drawing Sheets

NETWORK SYSTEM FOR SIMULTANEOUSLY COUPLING PAIRS OF NODES

This application is a continuation of application Ser. No. 07/609,015, filed on Nov. 1, 1990, now abandoned, which is a continuation of application Ser. No. 07/101,121, filed Sep. 25, 1987, now abandoned.

BACKGROUND OF THE INVENTION

The present invention relates to a network system in which a plurality of low-order networks, each having a plurality of nodes coupled via data paths, are mutually coupled by repeaters and data communication is performed between the nodes.

In a star network which uses a passive type optical star coupler as an optical distributor and executes data transmission between nodes by means of optical communication, it is inevitable that light attenuation is caused by the optical transmission path including the star coupler and the number of connectable nodes is limited. According to conventional network systems, therefore, network system expansion is realized by coupling a plurality of networks with optical repeaters that are each a relay device for system expansion.

Figure 1:
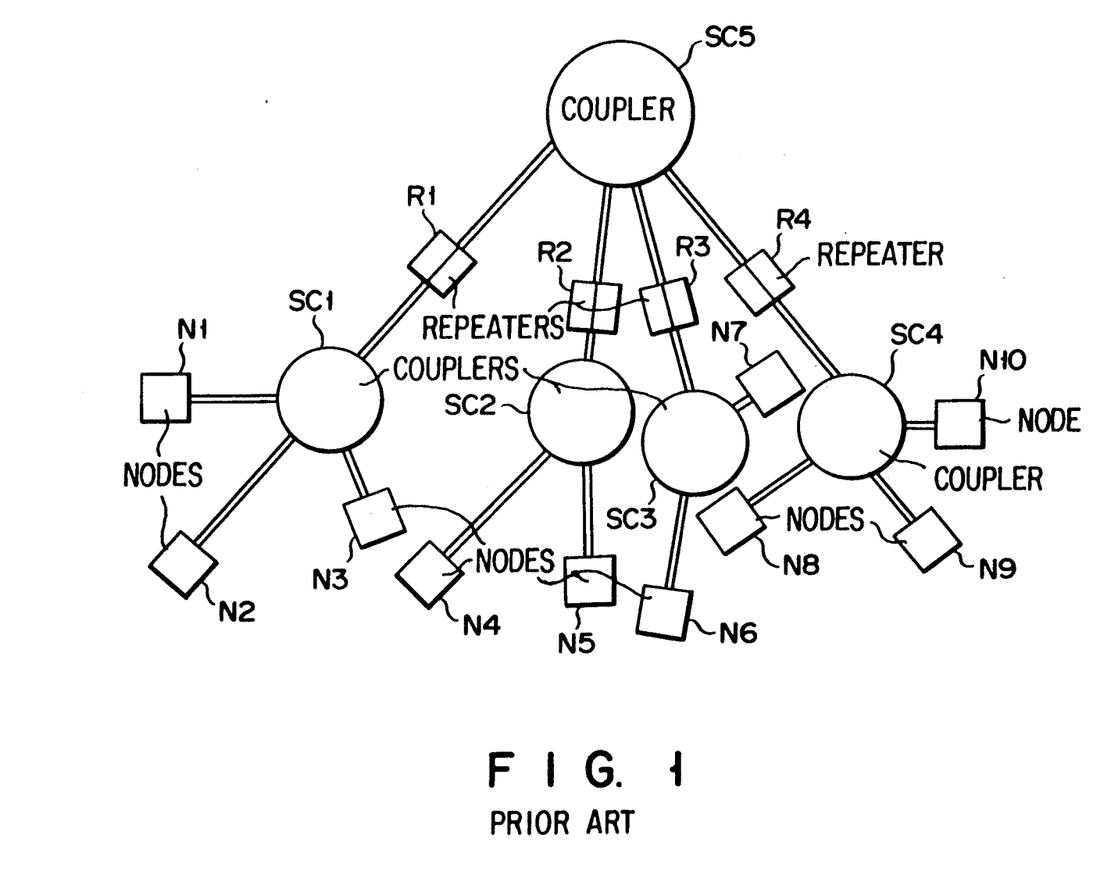
FIG. 1 is a block diagram exemplifying the structure of a conventional network system.

FIG. 1 illustrates an example of a network system that has been expanded using such repeaters.

The network system comprises nodes N1 to N10, star couplers SC1 to SC5 and repeaters R1 to R4. A small or low-order star network is constituted around each of star couplers SC1-SC5, and a large or high-order star network is constituted around star coupler SC5. Repeaters R1-R4 are coupled between star coupler SC5 and the remaining star couplers SC1-SC4.

In the system illustrated in FIG. 1, if the high-order star network is a non-multiplexed or single-wavelength network, it can permit data communication only between a single pair of low-order star networks. For instance, data transfer from node N2 to node N5 is effected through star coupler SC1, repeater R1, star coupler SC5, repeater R2 and star coupler SC2 in the named sequence. During the data transfer the high-order star network is occupied by the task so that another data transfer, for example, from node N6 to node N9 is not possible. In this case, therefore, the data transfer from node N6 to node N9 becomes possible only upon completion of the data transfer from node N2 to node N5.

SUMMARY OF THE INVENTION

As described above, conventional network systems expanded with repeaters entail a problem that only a single pair of low-order networks are allowed for data communication therebetween.

With the above situation in mind, it is an object of this invention to provide a network system which allows data communication between plural pairs of networks by the use of improved repeaters.

The repeater used in the network system of this invention comprises a switching circuit system including a plurality of switching circuits for selectively coupling low-order networks and a switch controller for controlling the switching operation of the switching circuits in accordance with a communication request from each node.

According to the network system of this invention, the switch controller responsive to the communication request from each node connects data paths between different networks, thus ensuring simultaneous data communication between plural pairs of networks.

DETAILED DESCRIPTION OF THE PREFERRED EMBODIMENTS

Figure 2:
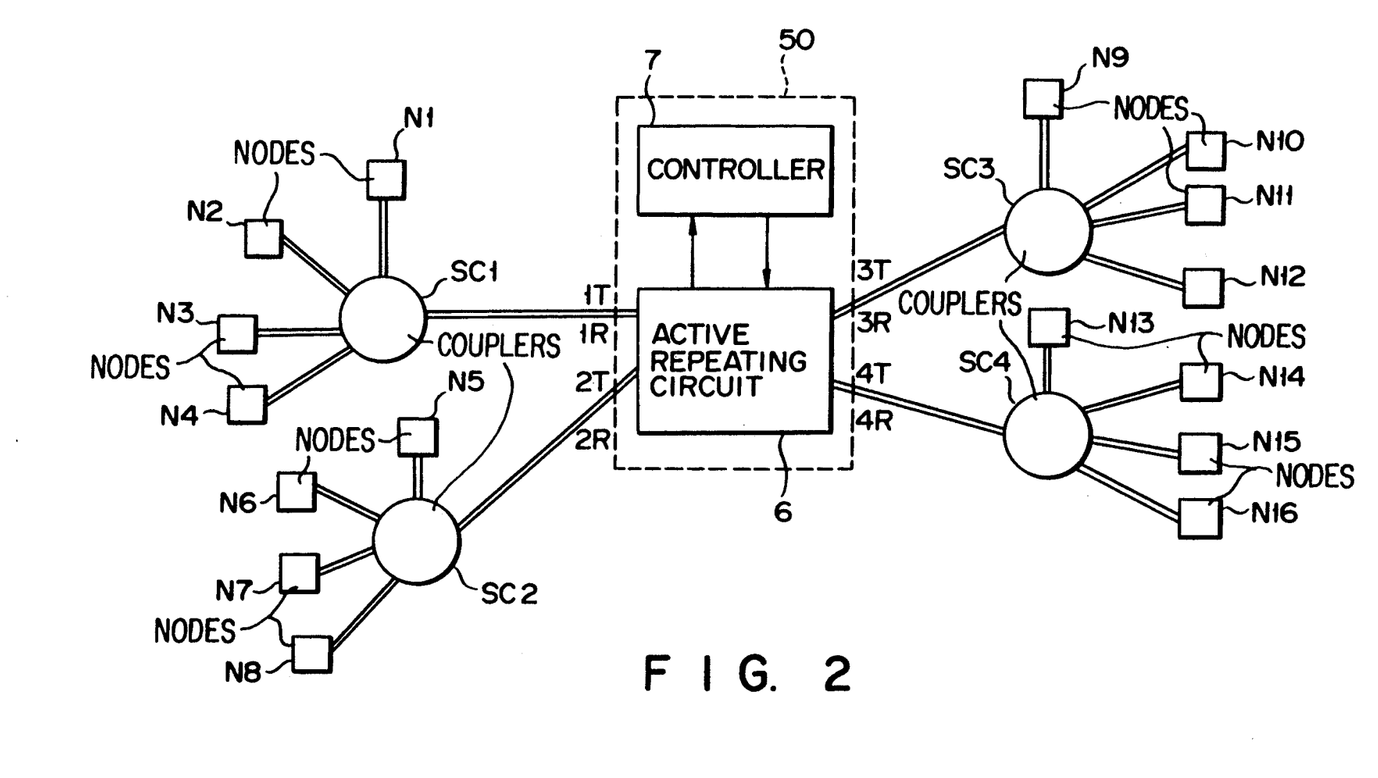
FIG. 2 is a block diagram of the structure of a network system according to the first embodiment of this invention.

FIG. 2 illustrates the structure of a network system according to the first embodiment of this invention.

This network system comprises nodes N1 to N16, optical star couplers SC1 to SC4 and an active repeater 50.

Low-order star networks are constituted around the respective star couplers SC1-SC4 using optical fiber calbles for the transmission paths. Each star network is coupled with the center unit, i.e., star coupler SC1, SC2, SC3 OR SC4, and nodes N1-N4, N5-N8, N9-N12 or N13-N16. Active repeater 50 has an active repeating circuit 6 for relaying the individual star networks and a controller 7 for controlling the active repeating circuit 6.

Figure 3:
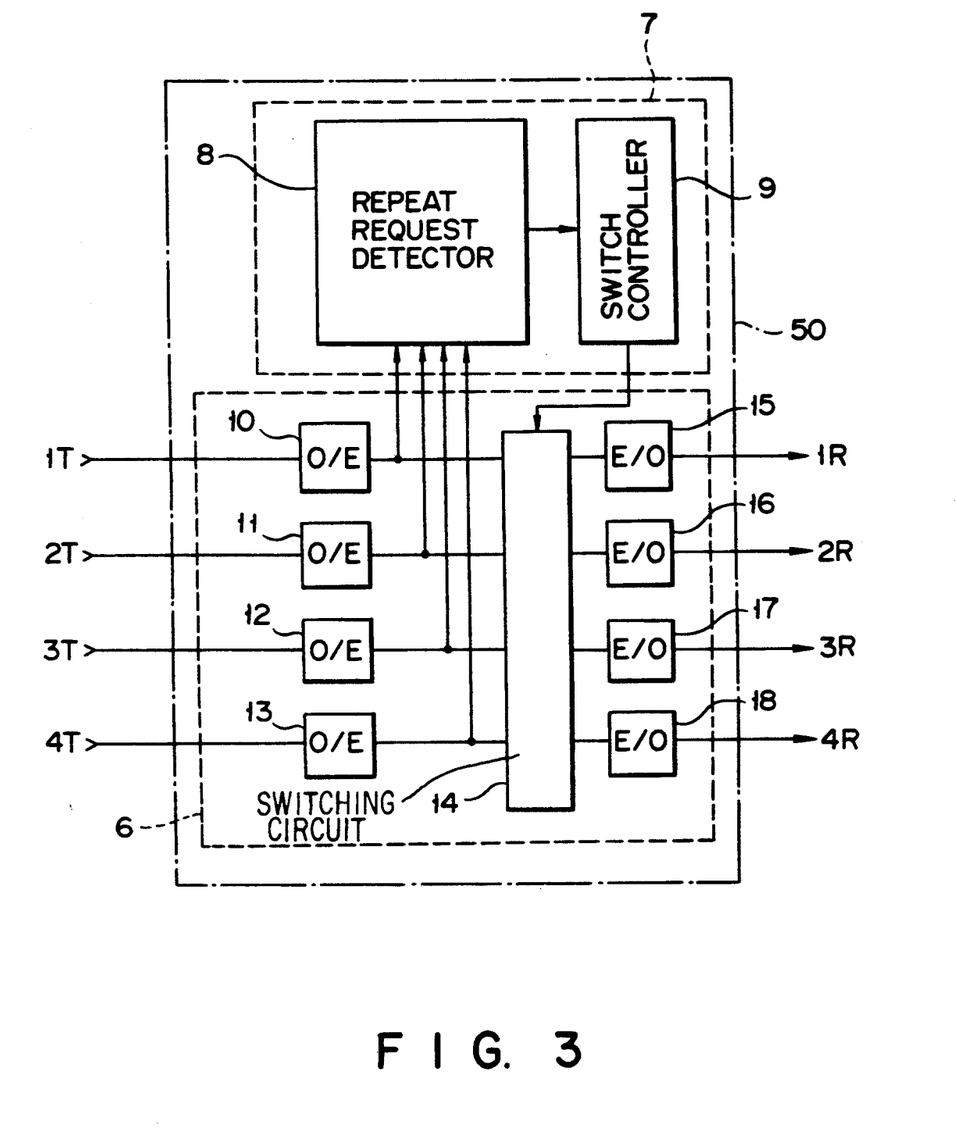
FIG. 3 is a detailed block diagram of part of the system shown in FIG. 2.

FIG. 3 illustrates a detailed structure of active repeater 50.

As illustrated, controller 7 has a repeat request detector 8 and a switch controller 9. Active repeating circuit 6 has an optoelectric (O/E) converters 10 to 13, a switching circuit 14 and electro-optic (E/O) converters 15 to 18.

O/E converters 10-13, which are respectively coupled to star couplers SC1-SC4, has an ability to convert an optical signal transmitted through transmission optical fiber cables 1T to 4T into an electric signal. The converted outputs from individual O/E converters 10-13 are sent to switching circuit 14 and repeat request detector 8, which are both coupled to these O/E converters. Switching circuit 14 selectively connects the data transmission paths between star couplers SC1-SC4 of the individual star networks and may be constituted by a plurality of switches arranged and coupled in a matrix form. E/O converters 15-18 each convert an electric signal supplied through switching circuit 14 into an optical signal. The converted outputs of E/O converters 15-18 are transferred to the star networks through reception optical fiber cables 1R to 4R.

Repeat request detector 8 of controller 7 detects a repeat request from the converted outputs of O/E converters 10-13. Based on the detection result, switch controller 9 of controller 7 controls the switching operation of switching circuit 14.

The operation of the network system with the above arrangement will now be explained.

When a repeat request is sent from any of nodes N1-N16, the request signal is applied to active repeating circuit 6 of active repeater 50, and is then transferred to repeat request detector 8 through one of O/E converters 10-13. Repeat request detector 8 detects the repeat request signal and sends a control signal corresponding to the detection result to switch controller 9. In response to the control signal, switch controller 9 controls switching circuit 14 according to the detection result. More specifically, switching circuit 14 connects the associated data transmission paths together so as to permit data communication between the node at which the repeat request signal is generated and the node which is the target requested by that repeat request signal.

Suppose that a repeat request signal for requesting data transfer from node N1 to node N9 is generated at node N1. This repeat signal is transferred to repeat request detector 8 sequentially through star coupler SC1, transmission optical fiber cable 1T and O/E converter 10. Switch controller 9 responds to the output from repeat request detector 8 and controls switching circuit 14 in accordance with the repeat request signal. Specifically, switching circuit 14 connects the output terminal of O/E converter 10 to the input terminal of E/O converter 17 so that data transfer from node N1 to node N9 can be executed.

If, during the data transfer from node N1 to node N9, a new repeat request signal for data transfer between nodes that belong to other star networks (those having other star couplers than SC1 and SC3), e.g., data transfer from node N5 to node M13 is generated at node N5, the repeat request signal is transferred to repeat request detector 8 through the sequence of star coupler SC2, transmission optical fiber cable 2T and O/E converter 11. Under the control of switch controller 9 based on the output of this detector 8, switching circuit 14 connects the output terminal of O/E converter 11 to the input terminal of E/O converter 18, thereby allowing for data transfer from node N5 to node N13.

According to this network system, as described above, since switching circuit 14 that is controlled by switch controller 9 connects the data transmission paths between the source and destination star couplers of the star networks, it is possible to perform data communications between plural pairs of star networks at the same time.

Figure 4:
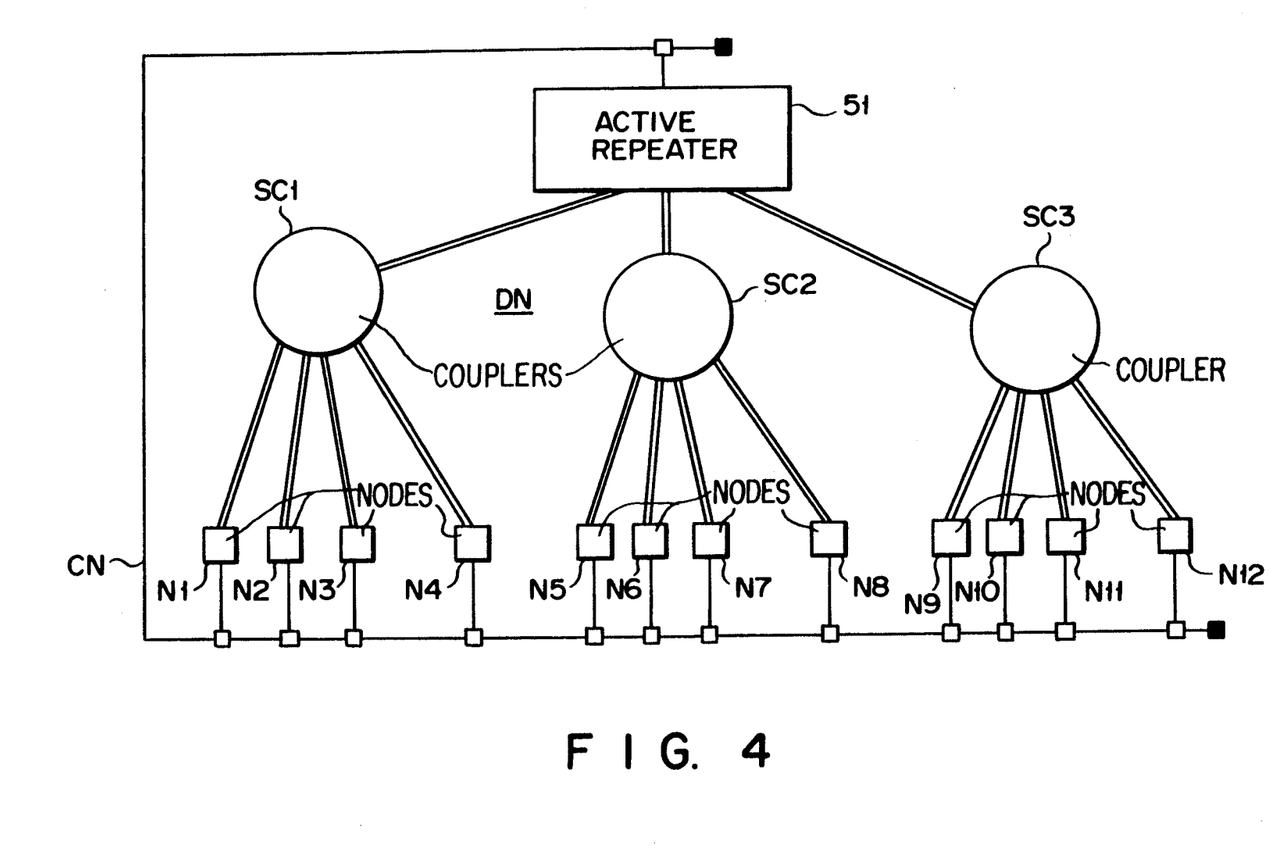
FIG. 4 is a block diagram illustrating the structure of a network system according to the second embodiment of this invention.

FIG. 4 illustrates the structure of a network system according to the second embodiment of this invention.

The major difference between this network system of FIG. 4 and that of FIG. 2 is that the former system uses a double network structure having a data network DN and a control network CN. The network system shown in FIG. 4 is constituted by three networks built around star couplers SC1 to SC3, respectively.

As the data network DN for transferring data, e.g., image data, at a high speed, an optical transfer system having an optical fiber cable as a transmission medium is used, while a transmission system having a coaxial cable as a transmission medium is used as the control network system CN.

Most part of an active repeater 51 of the system shown in FIG. 4 is basically the same as active repeater 50 shown in FIG. 3. Differences lie in that in active repeater 51 a repeat request is input to repeat request detector 8 via control network CN (via a data transmission path in repeater 50) and unlike active repeater 50, this active repeater 51 has a queue table memory in which generated repeat requests are sequentially registered in this queue table memory.

Figure 5:
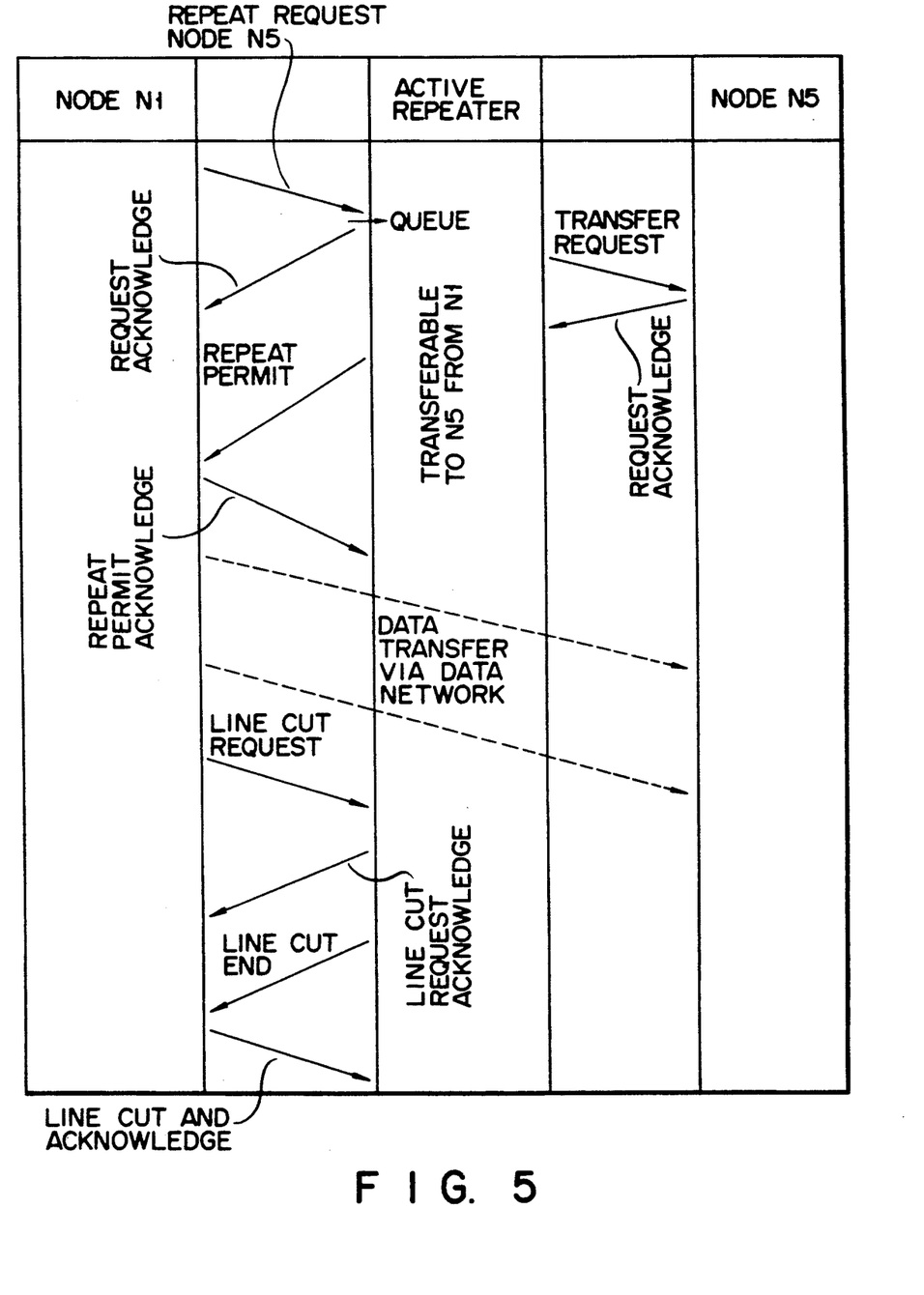
FIG. 5 is a diagram for explaining the operation of the system shown in FIG. 4.

Referring now to FIG. 5, the operation of the network system shown in FIG. 4 will be explained.

For instance, to perform data transfer from node N1 to node N5, a repeat request signal generated at node N1 is sent to active repeater 51 via control network CN where it is registered in a queue table stored in the queue table memory. Upon registering the repeat request signal, a request acknowledge signal is sent to node N1 via control network CN and a transfer request signal is sent to node N5 from active repeater 51 via control network CN. In response to this transfer request, node N5 sends a request acknowledge signal to active repeater 51 via control network CN. When the network system is ready to transfer data from node N1 to node N5, active repeater 51 sends a repeat permit signal to node N1. Upon receipt of the repeat request signal, node N1 returns a repeat permit acknowledge signal to active repeater 51. Needless to say, switching circuit 14 of active repeater 51 connects the necessary lines for the requested data transmission paths. When active repeater 51 receives the repeat permit acknowledge signal, data transfer from node N1 to node N5 via data network DN starts. Upon completion of this data transfer, node N1 sends a line cut request signal to active repeater 51 via control network CN. In response to this request signal, active repeater 51 returns a line cut request acknowledge signal to node N1 and cuts the line from node N1 to node N5. After the line is cut, active repeater 51 sends a line cut end signal to node N1 via control network CN and node N1 returns a line cut end acknowledge signal to the active repeater 51.

In the above, data transfer from node N1 to node N5, i.e., data communication between star couplers SC1 and SC2, has been explained as one example; data communications between other nodes involving a plurality of star couplers are also performed in the above described manner. Since active repeater 51 has the same switch controller 9 and switching circuit 14 as active repeater 50 of FIG. 3, the network system according to the second embodiment can also simultaneously perform data communications between plural pairs of star networks as per the system according to the first embodiment.

Figure 6:
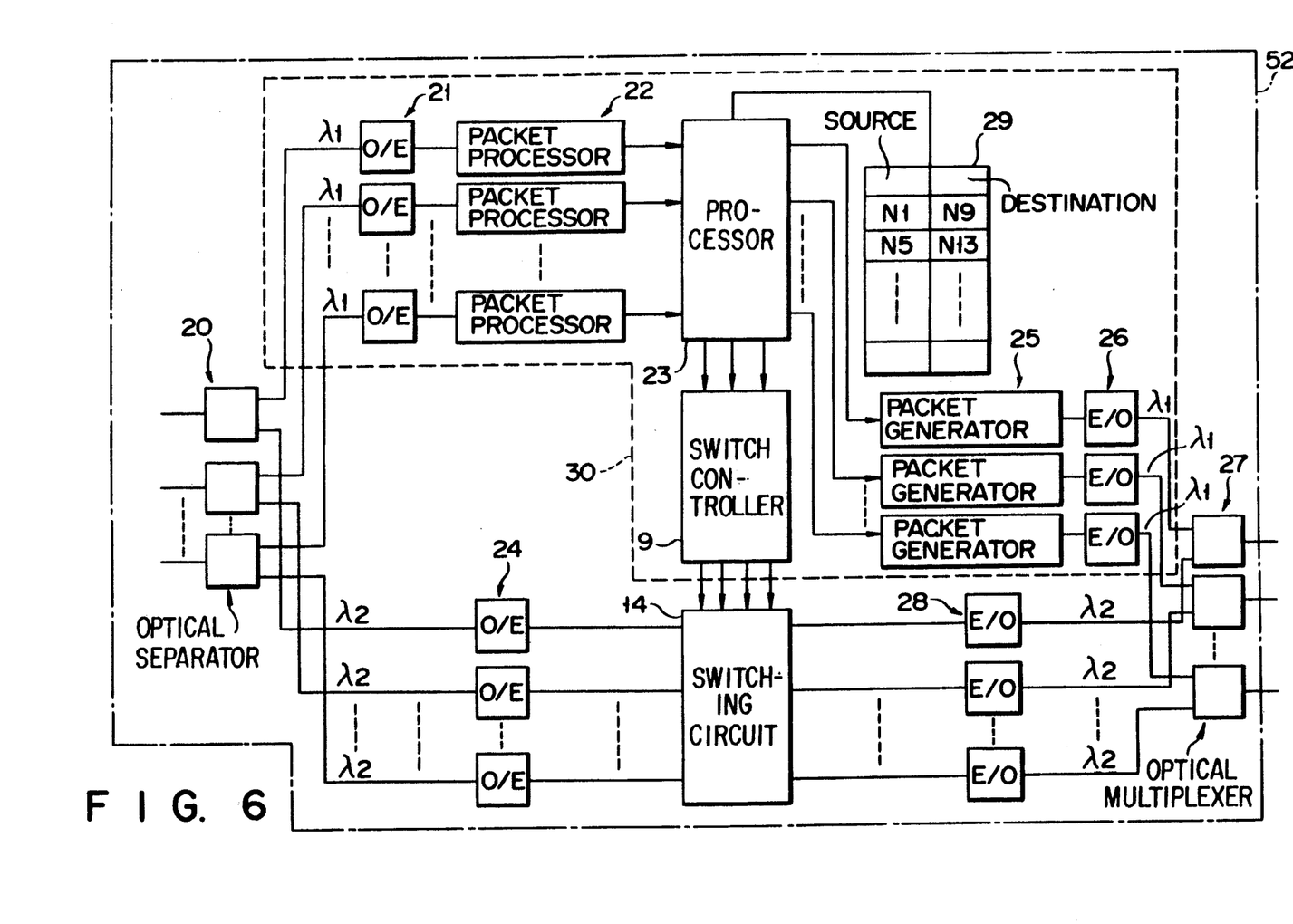
FIG. 6 is a block diagram of the structure of a repeater used in the third embodiment of this invention.

FIG. 6 illustrates the structure of an active repeater 52 used in a network system according to the third embodiment of this invention. The network system of this embodiment is constituted as a double network system where a data signal and a control information signal are multiplexed using a wavelength (frequency) multiplexing system.

Active repeater 52 has a switching circuit 14, a controller 30, an optical separator group 20, an O/E converter group 24, an optical multiplexer group 27 and an E/O converter group 28. Controller 30 has a switch controller 9, an O/E converter group 21, a packet processor group 22, a processor 23, a packet generator group 25, an E/O converter group 26 and a queue table memory 29. Active repeater 52 is used in the network system that has substantially the same structure as is shown in FIG. 2. That is, this active repeater 52 can replace active repeater 50 in the network system shown in FIG. 2. In this case, however, each node N1, N2, . . . has a separator at its input section for separating a control information signal from a data signal and has a multiplexer at its output section for multiplexing the control information signal and data signal. At each node, the control information signal and data signal are distinctly treated.

A control information signal including schedule information is transmitted in a wavelength of λ1 while a data signal is transmitted in a wavelength of λ2. The control information signal is transmitted in the form of a packet and is processed by packet processor group 22 in active repeater 52, so that individual pieces of information are separated from the packet and are supplied to processor 23. Processor 23 manages queue table memory 29 in which a source and a destination is registered, and controls switch controller 9 based on the table information. Switching controller 9 controls the line switching operation of switching circuit 14. The outputs from packet generator group 25 are converted into optical signals with a wavelength of λ1 which are in turn transmitted to the respective star couplers through optical multiplexer group 27. O/E converter group 24 converts an optical signal with a wavelength of λ2 into an electric signal. E/O converter group 28 converts an electric signal sent through switching circuit 14 into an optical signal. The converted outputs of E/O converter group 28 are transmitted to the respective star couplers through multiplexer group 27.

Figure 7:
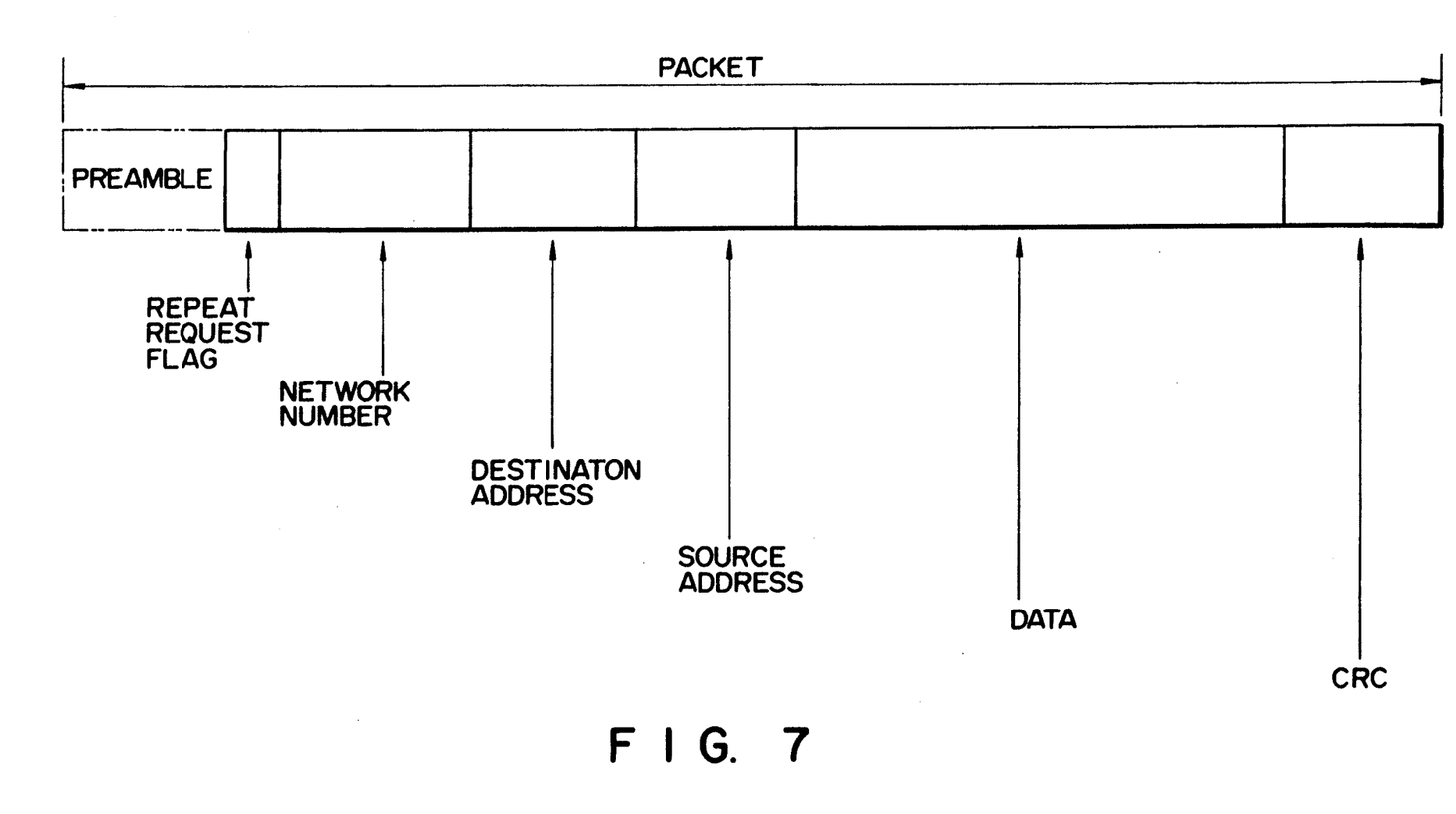
FIG. 7 is a diagram illustrating a format of a data packet used in a network system that uses the repeater shown in FIG. 6.

FIG. 7 illustrates a format of a packet.

In each packet, a preamble, a repeat request flag, the number of a destination network (repeat network), a destination address, a source address, data and a CRC (cyclic redundancy check) code as an error detection code are arranged in the named order.

Figure 8:
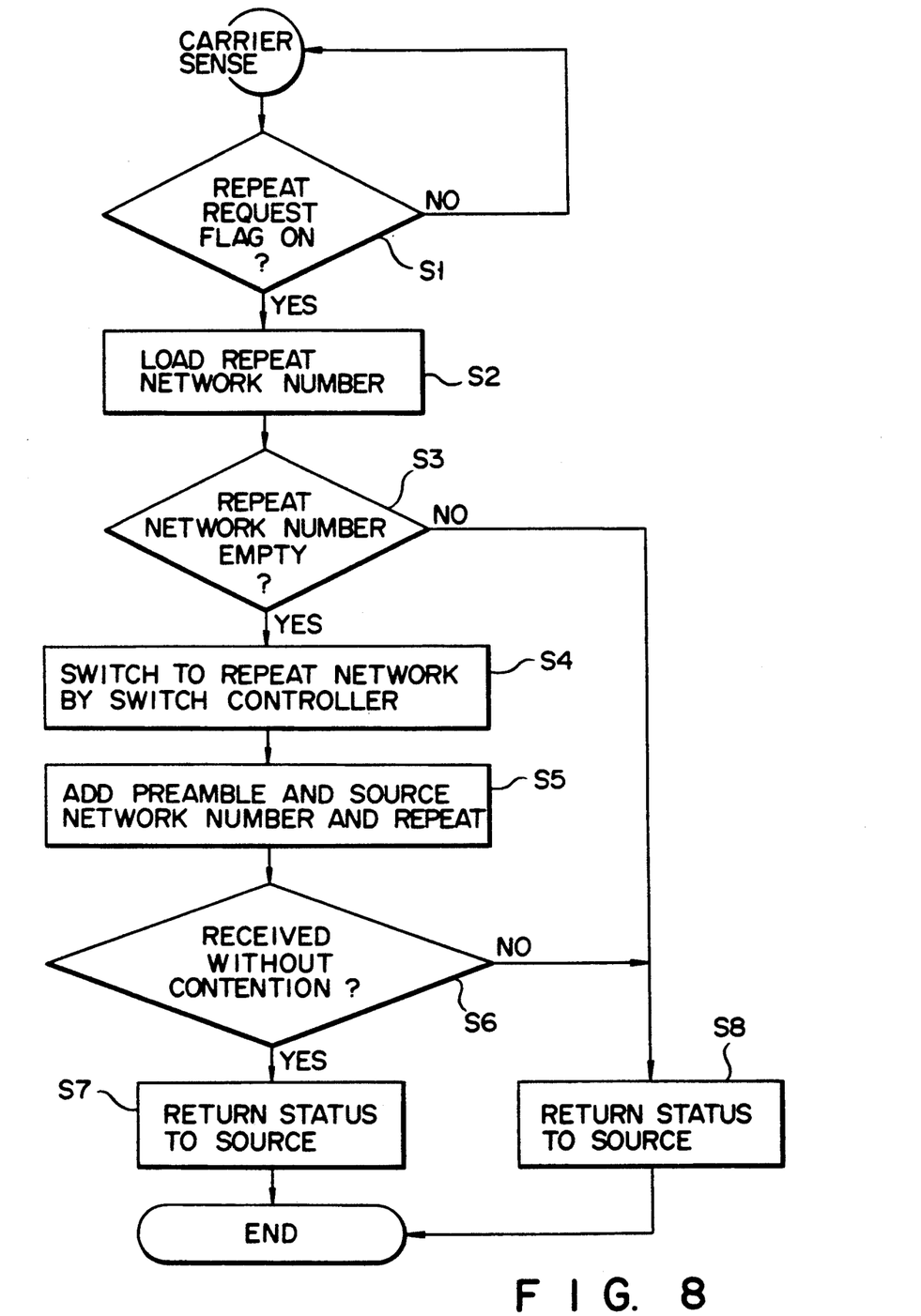
FIG. 8 is a flowchart for explaining the operation of the system using the repeater shown in FIG. 6.

The operation of the above system will now be explained with reference to the flowchart of FIG. 8.

For instance, data transfer from star coupler SC1 to star coupler SC2 is performed in the following manner.

Processor 23 determines whether or not the repeat request flag is on (step S1), and loads the number of a destination network (step S2) when the decision is "YES," i.e., when the repeat request flag is on. Processor 23 then determines whether or not the destination network is empty (step S3). If the decision is "YES" (i.e., if the destination network is empty), switching circuit 14 is switched to the destination network under the control of switch controller 9 to connect the necessary lines (step S4). Data is added with a preamble and the number of a source network and is output from the repeater (step S5). In the subsequent step (step S6), it is determined whether or not the data is received without contention. If the decision is "YES," an acknowledge signal is returned to the source (step S7). If the decision in step S3 or S6 is "NO," an acknowledge signal indicating the decision is returned to the source (step S8).

In this manner, the line switching of the data transfer paths by switching circuit 14 can be controlled and the data can be properly transmitted using a wavelength multiplexing system with wavelengths λ1 and λ2. Also, the use of the queue table is advantageous to manage the scheduling of the data transfer.

Further, an interrupt flag may be prepared in the packet such that upon detection this interrupt flag, the requested data transfer can be queued with the highest priority. In addition, the priority may be determined in advance by the type of transfer data, the nodes of the source and/or the destination, or a combination of the two methods.

Figure 9:
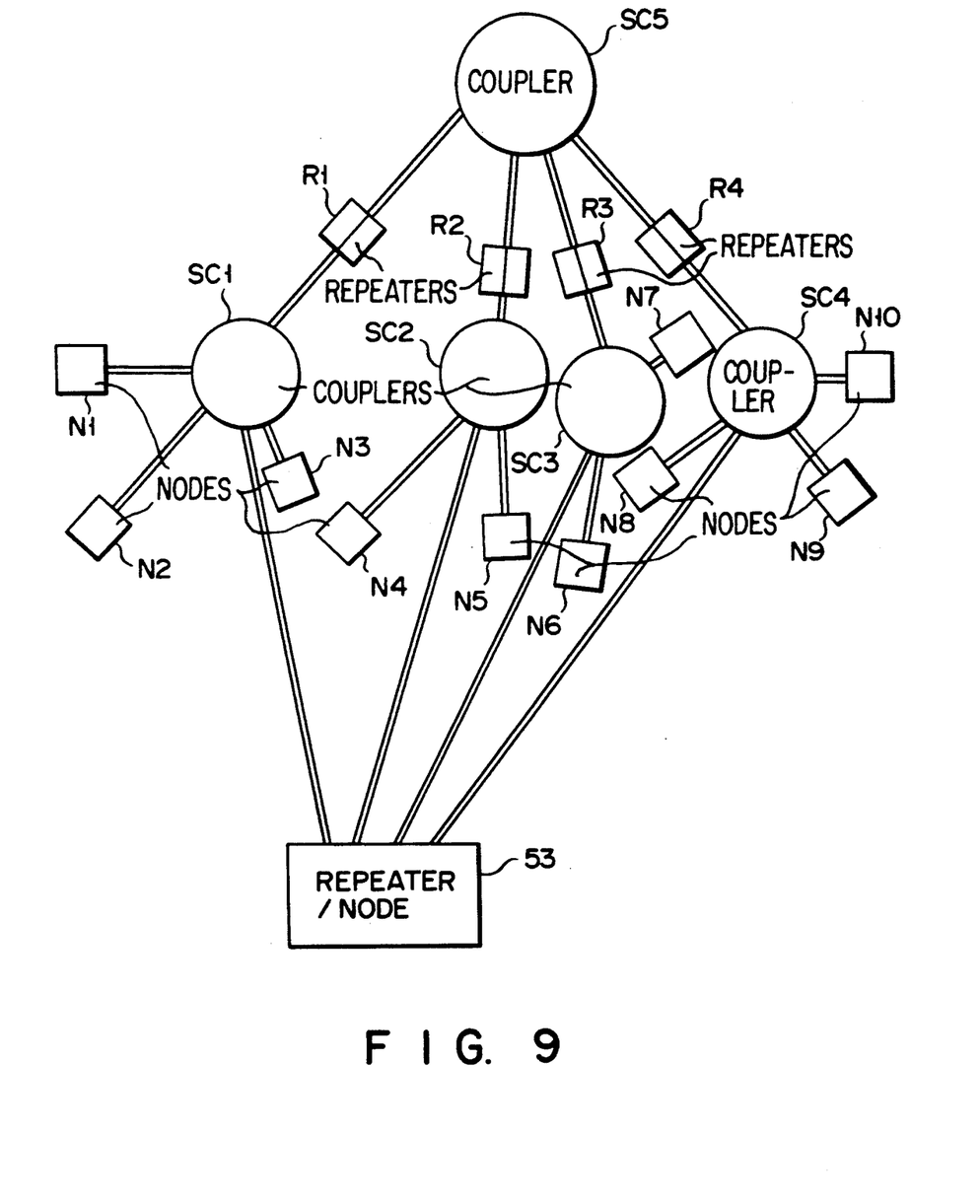
FIG. 9 is a block diagram showing the structure of a network system according to the fourth embodiment of this invention.

FIG. 9 illustrates a network system according to the fourth embodiment of this invention in which one of nodes coupled to a star coupler is provided with a function of an active repeater.

A repeater/node 53, which is a node capable of serving as an active repeater, is coupled to star couplers SC1 to SC4 to which the other nodes N1 to N10 are also coupled. These star couplers SC1-SC4 are coupled to a star coupler SC5 through existing repeaters R1 to R4, respectively.

In this case, the network that is coupled to star coupler SC5 through repeaters R1-R4 serves as a control network for transferring control information and data is transferred between star couplers SC1-SC4 through repeater/node 53.

According to this network system, a particular node of an existing system can simply be replaced with repeater/node 53 and no additional node is required to the existing system.

Figure 10:
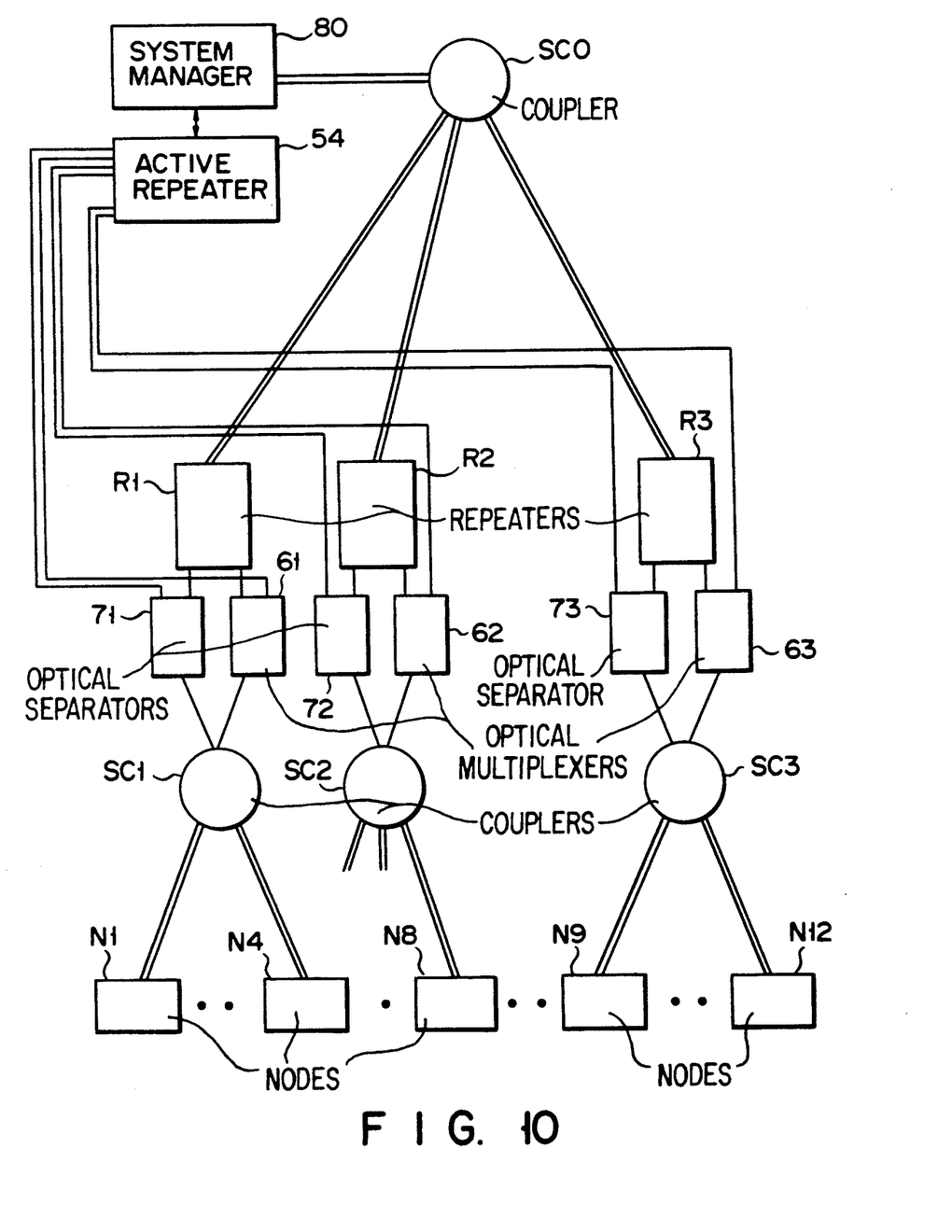
FIG. 10 is a block diagram illustrating the structure of a network system according to the fifth embodiment of this invention.

FIG. 10 illustrates a network system according to the fifth embodiment of this invention in which the control network of the network system according to the second embodiment shown in FIG. 4 is replaced with the one that uses an optical fiber cable transfer path in place of a coaxial cable.

According to this embodiment, star couplers SC1 to SC3 are coupled to a star coupler SC0 through existing repeaters R1 to R3, thus constituting a control network, while the star couplers SC1-SC3 are coupled to an active repeater 54 to constitute data networks. Optical multiplexers 61 to 63 and optical separators 71 to 73 are provided respectively between star couplers SC1-SC3 and existing repeaters R1-R3 and active repeater 54 so that a data signal transferred through active repeater 54 and a control information signal transferred through star coupler SC0 are multiplexed or separated from each other with different wavelengths. The cooperative operation of active repeater 54 and star coupler SC0 is controlled by a system manager 80.

This invention is not limited to the aforementioned particular embodiments in terms of the number of nodes, the number of low-order networks and the mode of each network. This invention can be modified in various manners without departing from the scope of the invention.

What is claimed is:

1. A network system in which at least four star networks each having a plurality of nodes are coupled through data transfer paths for transmission of a data signal, said star networks being mutually coupled by a repeater for performing data communication between said nodes, said repeater comprising:

switching circuit means including a plurality of switching circuits enabling pair of said star networks to be selectively and simultaneously coupled; and switch controller means for monitoring a communication request generated from a given node in a given network which request communication with another node in another network and activating one of switching circuits corresponding to the given star network and the other star network in accordance with the communication request, whereby data communication between a given node in a first star network and a given node in a second star network and data communication between a given node in a third star network and a given node in a fourth star network are simultaneously performed.

2. A network system comprising:

at least four star networks each having a plurality of nodes coupled through data transfer paths, for transmission of a data signal; and an active repeater for coupling said star networks, said active repeater having switching circuit means including a plurality of switching circuits enabling pairs of said star networks to be selectively and simultaneously coupled, and switch controller means for monitoring a communication request generated from a given node in a given network which request communication with another node in another network and activating one of said switching circuits corresponding to the given star network and the other star network in accordance with the communication request, whereby data communication between a given node in a first star network and a given node in a second star network and data communication between a given node in a third star network and a given node in a fourth star network are simultaneously performed.

3. The system according to claim 2, wherein said data signal includes control information including a communication request, and said switch controller means has means for discriminating said communication request from the remainder of said data signal.

4. The system according to claim 2, wherein a data signal and a control signal including communication request information are transferred through different transfer systems, said switching circuit means is inserted in at least that transfer system which transfers said data signal and said switch controller means is responsive to a signal from at least that transfer system which transfers said control signal.

5. The system according to claim 2, wherein said switch controller means has queue memory means for storing a queue for a plurality of communication request signals and controls said switching circuit means in accordance with an order of said queue.

6. The system according to claim 5, wherein said switch controller means includes means for changing said order of said queue in accordance with a predetermined priority order of communication request signals.

7. The system according to claim 2, wherein said active repeater is assembled in at least one of said nodes.

8. The system according to claim 2, wherein a data signal and a control signal including communication request information are separately transferred through different transfer systems of a double network.

9. The system according to claim 2, wherein said switch controller means controls said switching circuit means in accordance with a predetermined priority order of communication request signals.

10. The system according to claim 2, wherein a data signal is transferred by a first frequency, a control signal is transferred in a second frequency, the control signal is transferred in a packet, and a header of the packet includes the communication request signal formed of a repeat request flag, the other network number, and the other node number.

11. The system according to claim 10, wherein each of said nodes includes means for separating an input signal into the data signal and the control signal and means for multiplexing the data signal and the control signal to form an output signal.

12. A network system in which at least four star couplers including first star couplers and second star couplers each having nodes are connected to each other by means of a repeater for performing data communication between any pair of said nodes, said repeater comprising:

a plurality of switching means respectively connected between said first star couplers and said second star couplers for enabling pairs of said first and second star couplers to be selectively and simultaneously connected; and switch controller means for monitoring a communication request denoting data communication from a first node connected to a given first star coupler to a second node connected to a given second star coupler and activating one of said switching means connected between said given first star coupler and said given second star coupler in accordance with the communication request, thereby enabling data communications between pair of said nodes;

whereby data communication between a given node in a first star coupler and a given node in a second star coupler and data communication between a given node in another first star coupler and a given node in another second star coupler are simultaneously performed.

13. A system according to claim 12, wherein said repeater is assembled in at least one of said nodes.

14. A system according to claim 12, wherein said switch controller means comprises queue memory means for storing a queue in response to said communication request monitored and means for controlling and switching means in accordance with the contents of said queue memory means.

15. A network system in which at least four star couplers each having nodes are mutually connected to each other for providing a data network by means of a repeater and said nodes being mutually connected to each other for providing a control network by means of said repeater, said repeater comprising:

a plurality of switching means respectively connected between first star couplers and second star couplers via the data network for enabling pairs of said first and second star couplers to be selectively and simultaneously connected; and switch controller means for monitoring a communication request supplied via the control network and denoting data communication from a first node connected to a given first star coupler to a second node connected to a given second star coupler and activating one of said switching means connected between said given first star coupler and said given second star coupler in accordance with the communication request, thereby enabling data communication between pairs of said nodes;

whereby data communication between a given node in a first star coupler and a given node in a second star coupler and data communication between a given node in another first star coupler and a given node in another second star coupler are simultaneously performed.

16. A network system comprising at least four low-order star couplers each having nodes and a high-order star coupler connected to said low-order star couplers, said low-order star couplers being mutually connected to each other by a repeated for performing data communication between any pair of said nodes, said repeater comprising:
 a plurality of switching means respectively connected between said low-order star couplers for enabling pairs of said low-order star couplers to be selectively and simultaneously connected; and
 switch controller means for monitoring a communication request denoting data communication from a first node connected to a given first low-order star coupler to a second node connected to a given second low-order star coupler and activating one of said switching means connected between said given first low-order star coupler and said given second low-order star coupler in accordance with the communication request, thereby enabling data communication between pairs of said nodes;
 whereby data communication between a given node in a first low-order star coupler and a given node in a second low-order star coupler and data communication between a given node in a third low-order star coupler and a given node in fourth low-order star coupler are simultaneously performed.

* * * * *